(12) United States Patent
Khandekar et al.

(10) Patent No.: US 9,294,218 B2
(45) Date of Patent: Mar. 22, 2016

(54) RATE PREDICTION IN FRACTIONAL REUSE SYSTEMS

(75) Inventors: Aamod Khandekar, San Diego, CA (US); Avneesh Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1290 days.

(21) Appl. No.: 11/168,904

(22) Filed: Jun. 28, 2005

(65) Prior Publication Data
US 2006/0014542 A1 Jan. 19, 2006

Related U.S. Application Data

(60) Provisional application No. 60/588,629, filed on Jul. 16, 2004.

(51) Int. Cl.
*H04W 16/02* (2009.01)
*H04W 16/12* (2009.01)
(Continued)

(52) U.S. Cl.
CPC ............ *H04L 1/0015* (2013.01); *H04L 1/0002* (2013.01); *H04L 1/0006* (2013.01);
(Continued)

(58) Field of Classification Search
CPC ............ H04W 36/00; H04W 36/0005; H04W 36/0061; H04W 36/0072; H04W 36/0088; H04W 36/0094; H04W 36/06; H04W 36/08; H04W 36/10; H04W 36/16; H04W 36/18; H04W 36/20; H04J 1/00; H04J 1/02; H04J 1/06; H04J 11/00; H04J 11/0023; H04J 11/0026; H04J 11/005; H04J 11/0069; H04J 11/0079; H04J 11/0086; H04J 11/0093
USPC ......... 370/328, 341, 343, 281, 295, 431, 436, 370/437, 478, 480, 481, 491, 500, 203, 208, 370/310, 318, 329–334, 464–465; 455/65, 455/452.1, 442
See application file for complete search history.

(56) References Cited

U.S. PATENT DOCUMENTS 5,991,636 A * 11/1999 Won et al. ..................... 455/522
6,137,787 A 10/2000 Chawla et al.
(Continued)

FOREIGN PATENT DOCUMENTS

CN 1484906 A 3/2004
GB 2318252 A 4/1998
(Continued)

OTHER PUBLICATIONS

Muneta et al, "A New Frequency-Domain Link Adaptation Scheme for Broadband OFDM Systems;" Vehicular Technology Conference, Sep. 19-22, 1999; pp. 253-257; NTT Network Service Systems Laboratories; Yokosuka-shi, Japan.
(Continued)

*Primary Examiner* — Brandon Renner
*Assistant Examiner* — Prince A Mensah

(57) ABSTRACT

Apparatus and methods for rate prediction in a wireless communication system having fractional frequency reuse are disclosed. A wireless communication system implementing Orthogonal Frequency Division Multiple Access (OFDMA) can implement a fractional frequency reuse plan where a portion of carriers is allocated for terminals not anticipating handoff and another portion of the carriers is reserved for terminals having a higher probability of handoff. Each of the portions can define a reuse set. The terminals can be constrained to frequency hop within a reuse set. The terminal can also be configured to determine a reuse set based on a present assignment of a subset of carriers. The terminal can determine a channel estimate and a channel quality indicator based in part on at least the present reuse set. The terminal can report the channel quality indicator to a source, which can determine a rate based on the index value.

47 Claims, 5 Drawing Sheets

(51) Int. Cl.
*H04L 1/00* (2006.01)
*H04L 1/20* (2006.01)
*H04L 5/00* (2006.01)
*H04L 1/18* (2006.01)
*H04L 27/26* (2006.01)

(52) U.S. Cl.
CPC .............. *H04L 1/20* (2013.01); *H04L 5/006* (2013.01); *H04L 5/0007* (2013.01); *H04L 5/0012* (2013.01); *H04W 16/02* (2013.01); *H04W 16/12* (2013.01); *H04L 1/0009* (2013.01); *H04L 1/0026* (2013.01); *H04L 1/1812* (2013.01); *H04L 27/2601* (2013.01)

(56) References Cited

U.S. PATENT DOCUMENTS

| | | | |
|---|---|---|---|
| 6,256,729 B1 | 7/2001 | Cherabuddi et al. | |
| 6,526,279 B1 * | 2/2003 | Dent | 455/437 |
| 6,591,108 B1 * | 7/2003 | Herrig | 455/452.1 |
| 6,687,239 B1 | 2/2004 | Koprivica | |
| 6,792,276 B1 * | 9/2004 | Butovitsch et al. | 455/453 |
| 6,907,228 B1 * | 6/2005 | Lohtia et al. | 455/62 |
| 6,940,827 B2 * | 9/2005 | Li et al. | 370/278 |
| 6,947,748 B2 | 9/2005 | Li et al. | |
| 7,164,649 B2 * | 1/2007 | Walton et al. | 370/203 |
| 7,307,972 B2 * | 12/2007 | Backes et al. | 370/331 |
| 7,403,528 B2 * | 7/2008 | Hu et al. | 370/394 |
| 8,483,691 B2 | 7/2013 | Ji et al. | |
| 8,526,963 B2 | 9/2013 | Ji et al. | |
| 2002/0105925 A1 * | 8/2002 | Shoemake | 370/330 |
| 2002/0136268 A1 * | 9/2002 | Gan et al. | 375/133 |
| 2003/0060209 A1 * | 3/2003 | Bruin et al. | 455/452 |
| 2003/0169681 A1 * | 9/2003 | Li et al. | 370/203 |
| 2004/0097238 A1 * | 5/2004 | Hwang et al. | 455/447 |
| 2005/0025040 A1 * | 2/2005 | Tang et al. | 370/208 |
| 2005/0169229 A1 * | 8/2005 | Cho et al. | 370/344 |
| 2005/0186983 A1 | 8/2005 | Iochi | |

FOREIGN PATENT DOCUMENTS

| | | |
|---|---|---|
| JP | 2001274764 | 10/2001 |
| JP | 2001359152 | 12/2001 |
| JP | 2004129241 A | 4/2004 |
| JP | 2004159345 A | 6/2004 |
| JP | 2004172981 A | 6/2004 |
| JP | 2004173017 A | 6/2004 |
| JP | 200580286 | 3/2005 |
| WO | WO9602979 A2 | 2/1996 |
| WO | WO0249305 | 6/2002 |
| WO | WO02058300 | 7/2002 |
| WO | WO2004045228 | 5/2004 |

OTHER PUBLICATIONS

International Search Report; PCT/US2005/025170; Jan. 23, 2006.
European Search Report—EP10174614—Search Authority—Munich—Oct. 21, 2011.
Taiwan Search Report—TW094124010—TIPO—Mar. 27, 2012.
Written Opinion—PCT/US2005/025170, International Search Authority, European Patent Office, Jan. 23, 2006.

* cited by examiner

RATE PREDICTION IN FRACTIONAL REUSE SYSTEMS

BACKGROUND OF THE DISCLOSURE

1. Field of the Disclosure

The disclosure relates to the field of wireless communications. More particularly, the disclosure relates to rate prediction in a wireless communication system.

2. Description of Related Art

Wireless communication systems are often configured as a network of wireless base stations communicating with one or more mobile wireless terminals. Each of the wireless base stations can operate in a unique environment relative to any of the other base stations. For example, a base station can be configured to support a metropolitan coverage area having numerous high rise buildings with a high density of potential users. Another base station coupled to the same communication network can be configured to support a relatively sparsely populated coverage area that is substantially void of terrain variations that can affect the signal quality. Similarly, a first wireless base station can be configured to support a coverage area that includes numerous potential interfering sources, while a second base station can be configured to support a coverage area largely void of interfering sources.

Signal quality experienced by a particular user terminal within a base station coverage area can also vary based on a physical as well as an electrical environment. Mobile user terminals can experience signal degradation such as Doppler and fading that can be attributable the velocity and location of the user terminal as well as the configuration of the surrounding environment.

Therefore, each user terminal in a wireless communication system can experience unique operating conditions that affect the quality of the signals communicated between the user terminal and an associated base station. The base stations and user terminals typically prefer to communicate over a high bandwidth communication link. However, not all user terminals or base stations will be able to support the same information bandwidth because of the differences in operating conditions.

A wireless communication system may also allow the user terminals to handoff between base stations. In a handoff situation, the user terminal in handoff may not be able to support the same information bandwidth with the base stations involved in the handoff. Ideally, the user terminal hands off to a base station that is capable of supporting the same or higher information bandwidth. However, handoffs can be initiated for reasons other than improved communications. For example, a user terminal can handoff between base stations due to changes in location. That is, a user terminal can travel from a coverage area of a first base station to a coverage area of a second base station. The second base station may only have the ability to support a lower information bandwidth due to fading and interference experienced by the user terminal.

BRIEF SUMMARY OF THE DISCLOSURE

Apparatus and methods for rate prediction in a wireless communication system having fractional frequency reuse are disclosed. A wireless communication system implementing Orthogonal Frequency Division Multiple Access (OFDMA) can implement a fractional frequency reuse plan where a portion of carriers is allocated for terminals not anticipating handoff and another portion of the carriers is reserved for terminals having a higher probability of handoff. Each of the portions can define a reuse set. The terminals can be constrained to frequency hop within a reuse set. The terminal can also be configured to determine a reuse set based on a present assignment of a subset of carriers. The terminal can determine a channel estimate and a channel quality indicator based in part on at least the present reuse set. The terminal can report the channel quality indicator to a source, which can determine a rate based on the index value.

The disclosure includes a method for rate control in a fractional reuse communication system, including determining a subcarrier assignment within a reuse set of the fractional reuse communication system, transmitting a pilot signal, receiving a channel quality indicator value based in part on the subcarrier assignment and the pilot signal, determining a transmission format based in part on the channel quality indicator, and controlling a code rate based in part on the transmission format.

The disclosure also includes a method for rate control in a fractional reuse communication system, including determining a subcarrier assignment within a reuse set of the fractional reuse communication system, transmitting a pilot signal comprising a Frequency Division Multiplex (FDM) pilot signal and at least one dedicated pilot signal, receiving a channel quality indicator value based in part on the subcarrier assignment and the pilot signal, summing a power control increment and backoff value to the channel quality indicator to generate a modified channel quality indicator, comparing the modified channel quality indicator to a plurality of predetermined thresholds, determining a transmission format based in part on a threshold level exceeded by the modified channel quality indicator, and controlling a code rate based in part on the transmission format.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF THE DISCLOSURE

Figure 1:
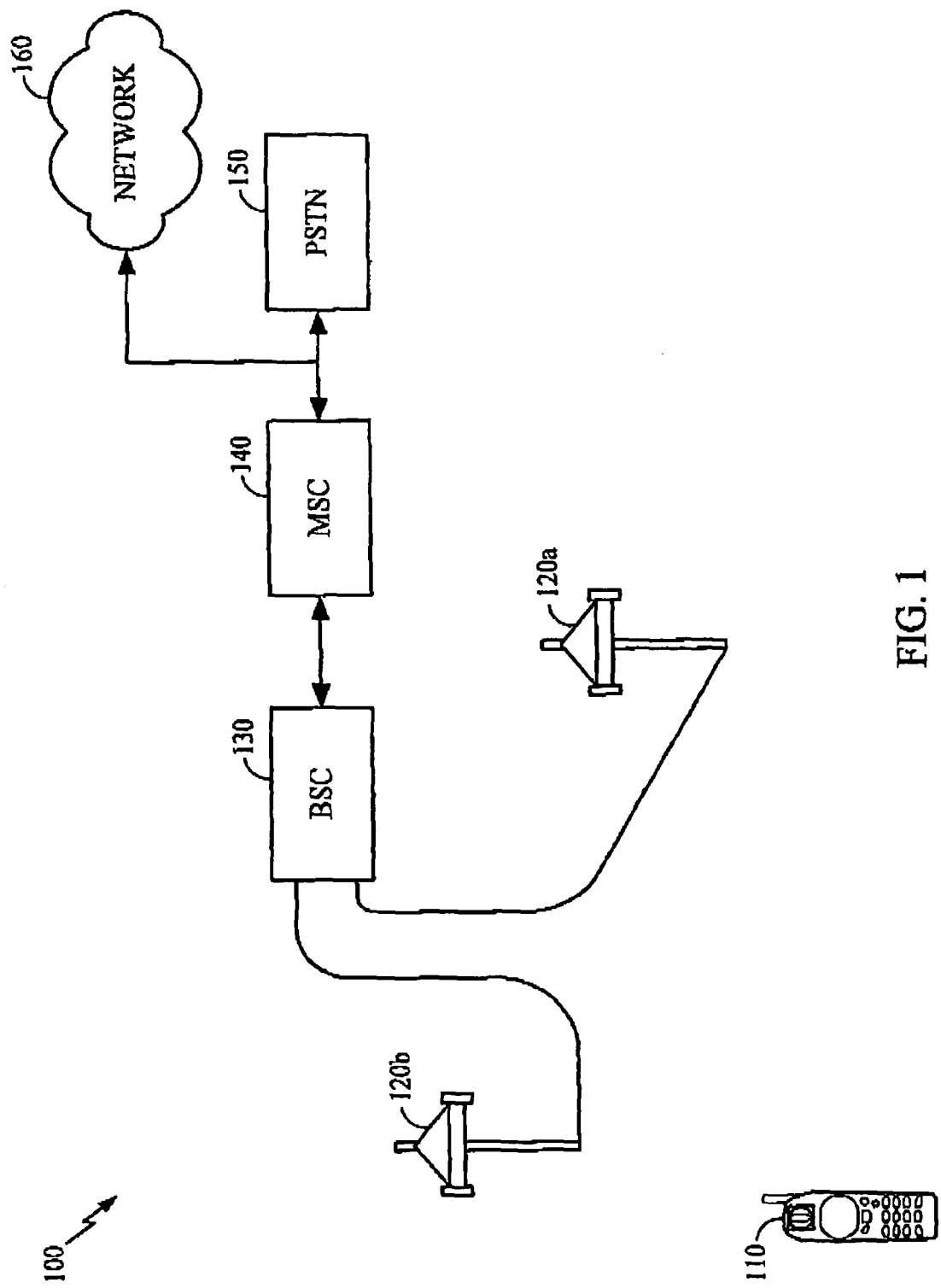
FIG. 1 is a functional block diagram of an embodiment of a wireless communication system configured to implement rate prediction and fractional reuse.

A wireless communication system implementing Orthogonal Frequency Multiple Access (OFDMA) and fractional reuse can define a plurality of carrier sets and can constrain communications with a user terminal to operate within one or more of the carrier sets.

An OFDMA system may utilize fractional reuse. In one embodiment of fractional reuse, a transmitter reserves part of the bandwidth for user terminals in handoff, thus allowing these user terminals to experience smaller interference levels. However, this may make the problem of rate prediction harder, because different reuse sets may see different channel qualities. Moreover, the user terminal may be blind to the reuse scheme.

Within a fractional reuse OFDMA wireless communication system a frequency hopping technique can be incorporated. Each user terminal has a hopping sequence assigned to it. This hopping sequence is constrained to hop within a reuse set. As a result, the user terminal can extrapolate the different reuse sets from the subcarriers assigned to it at any given time. The user terminal can then report a channel quality information (CQI) for any desired reuse set, for example, the reuse set on which the user terminal is scheduled.

In one embodiment, the user terminal can determine the different reuse sets based on a predetermined hopping sequence, where a reuse set can be determined as a set of subcarriers that hops within the reuse set. The user terminal can determine the subcarriers populating a reuse set using a variety of processes.

For example, the user terminal can select a subcarrier at a given time instant. The user terminal can then use the predetermined hopping sequence to determine where this subcarrier hops at the next time instant. The user terminal can add this subcarrier assignment to the reuse set. The user terminal can repeat the process until the set of identified subcarriers stops growing, that is, all new frequency hops are within the identified set of subcarriers. The identified set of subcarriers can be a reuse set. To determine the other reuse sets, the user terminal can select a subcarrier that is in not within the set of subcarriers identified in the any of the reuse sets determined so far. For example, the user terminal can select a subcarrier distinct from a present subcarrier assignment. The user terminal can then repeat the process to identify the remaining subcarriers in the reuse set. Generally, the user terminal can determine any reuse set based on a subcarrier assignment and a predetermined hopping sequence.

A user terminal can determine its assigned reuse set in a low complexity manner by examining the subcarrier assignments over the past few time intervals and assume that they form the reuse set. This algorithm works well for the "static reuse" case, where each user terminal is assigned a single reuse set for a large amount of time.

In the forward link (FL) direction, from the base station to the user terminal, the user terminal may, in an embodiment, determine a CQI based on a signal-to-noise ratio (SNR) of the user over a predetermined time period or a number of frames, such as a predetermined number of frames or a discrete time, e.g. 5 ms. The user terminal may also quantize the CQI information as one or more CQI values. In one embodiment, the CQI value is quantized at steps of 2 dB of the SNR. The user terminal can use pilot measurements to determine the channel strength while interference measurements can be based on data subcarriers. The user terminal transmits the quantized or non-quantized CQI to the base station. In an embodiment, the base station can modify this CQI to account for power control if pilot measurements do not take this into account. In one embodiment, compensation for power control is done in a linear manner, with the base station accounting for a +2 dB power control with a +2 dB change in the CQI. The base station then compares this modified CQI with a set of thresholds to determine which packet format and corresponding rate is to be assigned to the user terminal.

As mentioned above, the user terminal performs CQI determination based on interference estimation on the data subcarriers. The interference estimation can be performed on subcarriers assigned to other user terminals, because the user might not be scheduled all the time. In one embodiment, it may be important that the user terminal measures the interference power on subcarriers belonging to the reuse set, because the different reuse sets will see different interference statistics. Since a given subcarrier is constrained to hopping within its reuse set, the user can determine his reuse set by extrapolating from his past set of assigned subcarriers using the hopping sequence.

In other embodiments, the user terminal can determine the CQI for more than one reuse set, including a reuse set for which the user terminal is not assigned. In other embodiments, the user terminal can determine and report CQI for all possible reuse sets, the reuse set for which the user terminal was last scheduled, a predetermined group of reuse sets, or instructed reuse sets based upon communication with the base station.

The user terminal can measure the interference on a set of associated subcarriers within the reuse set using the same interference estimation algorithm used for data demodulation at the receiver. In one embodiment, the interference measurement algorithm can use blank pilots, i.e., dedicated symbols which the base station leaves blank. Corresponding to this measurement of interference power, the user terminal can also determine a measurement of channel strength using the FDM pilots. Using these two measurements, the user terminal can determine SNR for the set of associated subcarriers. The user terminal can get one SNR measurement for every set of associated subcarriers and for every hop. In this manner it can get several realizations of the SNR distribution that is seen over frequency and time. Using these realizations, it can compute the average value of the SNR that will be seen over the frame. The user terminal can transmit this measurement back to the base station.

In one embodiment, a rate prediction algorithm in the base station can be configured to target the third transmission for termination so that there is some potential for early termination in case of a pessimistic CQI measurement, and also some protection against errors in case the CQI measurement is optimistic. In one embodiment, the termination statistics are computed based on FER curves for the third transmission. In this embodiment, if the CQI value is higher than the threshold for the third transmission for the highest packet format, then rate prediction will target the second transmission. In this embodiment, if the CQI value is still higher than that required for the highest packet format, then rate prediction will go on to target the first transmission. In other embodiments, the rate prediction algorithm can be configured to initially target other transmissions for termination, such as the second or the first transmission based on delay or spectral efficiency requirements.

In a reverse link (RL) direction, a receiver in the base station can determine CQI values and report them to a transmitting user terminal. The RL rate prediction algorithm can be configured very similar to the FL algorithm. If the channel estimation on the reverse link is poor, for example due to low bit rate or lack of diversity on the RL transmission, a long averaging filter can be employed in order to get a more accurate CQI. In some reverse link embodiments, if the user terminal is not scheduled to transmit, the only pilots signals available may be on a control channel, which gives the base station access to only a few, for example 2-4, subcarriers, which may or may not be within the reuse set of the user terminal, of the entire frequency band in a period equal to that used for the FL. Thus, in an embodiment, the user terminal can average the CQI values over a longer period in order to obtain an accurate measurement. The averaging period can be of the order of 100 ms, but can be some other period that can be determined based on system designs. The interference measurement, as in the case of the FL, can be based on data subcarriers belonging to users in the same reuse set. One difference from the FL is that the base station has knowledge of all the reuse sets, and can in fact determine an individual CQI for each reuse set.

The averaging period of the CQI may create situations where the rate control algorithm is not be able to respond to the local channel fade. This is may not present issues since to some extent the changes in the rate may be limited by the channel assignment bandwidth. Moreover, the reverse link power control algorithm generally maintains the control channel SNR around fixed value, at a rate which is faster than that of the rate prediction algorithm. As a result, the rate prediction algorithm should see an SNR that is almost static.

The reverse link power control algorithm keeps the SNR of the control channel approximately constant. However, the data power spectral density (psd) can be offset from the control channel psd by an amount that is controlled by the user terminal. This offset can be communicated to the base station through in-band signaling when the user terminal is scheduled, and can be used in the CQI computation. Even if the user terminal is not scheduled for a significant interval, this offset can be assumed to vary by a small enough amount that the rate prediction algorithm does not have to take into account errors in the offset and may utilize prior offset values. Alternatively, the rate prediction algorithm can take an additional backoff based on the amount of time lapsed since the user terminal was last scheduled, that is, since the value of the offset was last communicated.

Once the CQI value is computed, the algorithm proceeds as in the case of the FL. The CQI value is compared with one or more predetermined thresholds for different packet formats, initially based on the third transmission. If the CQI is too high even for the least complex packet format at the third transmission, or if the packet has more stringent delay requirements, thresholds for the earlier transmissions may be used. A backoff control loop can be the same as used in the FL.

Rate prediction can be performed at a slow rate relative to the rate of data transmission. Thus, there are several other possible rate prediction embodiments. Since the power control algorithm keeps the control channel SNR essentially constant, the rate predicted by this algorithm should depend mainly on the value of the control channel offset. A rate prediction algorithm could thus build a table mapping the value of the offset to a packet format. If such a table were available, however, then rate prediction could be performed either at the base station or at the access terminal.

Another embodiment performs rate prediction simply based on the observed termination statistics and the termination requirements demanded by the QoS. This embodiment could also be done at either the access terminal or the base station. Such an algorithm, would, however, be somewhat ad-hoc in nature and would have to be developed through simulations.

FIG. 1 is a functional block diagram of an embodiment of a wireless communication system 100. The system includes one or more fixed elements that can be in communication with a user terminal 110. The user terminal 110 can be, for example, a wireless telephone configured to operate according to one or more communication standards. The user terminal 110 can be a portable unit, a mobile unit, or, a stationary unit. The user terminal 110 may also be referred to as a mobile unit, a mobile terminal, a mobile station, user equipment, a portable, a phone, and the like. Although only a single user terminal 110 is shown in FIG. 1, it is understood that a typical wireless communication system 100 has the ability to communicate with multiple user terminals 110.

The user terminal 110 typically communicates with one or more base stations 120a or 120b, here depicted as sectored cellular towers. As used herein, a base station may be a fixed station used for communicating with the terminals and may also be referred to as, and include some or all the functionality of, an access point, a Node B, or some other terminology. The user terminal 110 will typically communicate with the base station, for example 120b, that provides the strongest signal strength at a receiver within the user terminal 110. The one or more base stations 120a-120b can be configured to utilize fractional frequency reuse in which a fraction of the bandwidth for a base station, such as 120a, is shared with a fraction of the bandwidth allocated to an adjacent base station, such as 120b.

Each of the base stations 120a and 120b can be coupled to a Base Station Controller (BSC) 130 that routes the communication signals to and from the appropriate base stations 120a and 120b. The BSC 130 may be coupled to a Mobile Switching Center (MSC) 140 that can be configured to operate as an interface between the user terminal 110 and a Public Switched Telephone Network (PSTN) 150. The MSC 140 can also be configured to operate as an interface between the user terminal 110 and a network 160. The network 160 can be, for example, a Local Area Network (LAN) or a Wide Area Network (WAN). In one embodiment, the network 160 includes the Internet. Therefore, the MSC 140 is coupled to the PSTN 150 and network 160. The MSC 140 can also be configured to coordinate inter-system handoffs with other communication systems (not shown).

The wireless communication system 100 can be configured as an OFDMA system with communications in both the forward link and reverse link utilizing OFDM communications. The term forward link refers to the communication link from the base stations 120a or 120b to the user terminal 110, and the term reverse link refers to the communication link from the user terminal 110 to the base stations 120a or 120b. Both the base stations 120a and 120b and the user terminal 110 may allocate resources for channel and interference estimation. For example, both the base stations 120a and 120b and the user terminal 110 may broadcast pilot signals that are used be the corresponding receivers for channel and interference estimation. For the sake of clarity, the description of the system embodiment discusses rate prediction in the forward link performed by the base station, such as 120a. However, it is understood that rate prediction is not limited to application in the forward link, but may be used in both the forward link as well as the reverse link, or may be implemented in one communication link exclusive of the other.

The base stations 120a and 120b can be configured to broadcast a pilot signal for purposes of channel and interference estimation. The pilot signal can include a number of tones selected from the OFDM frequency set. For example, the common pilot signal can utilize uniformly spaced tones selected from the OFDM frequency set. The uniformly spaced configuration may be referred to as a comb pilot signal. Alternatively, the common pilot signal can be formed from uniformly spaced carriers selected from the OFDM frequency set and dedicated pilot signals that are blanked.

The base stations 120a and 120b can also be configured to allocate a set of carriers from a reuse set to the user terminal 110 for communications. The set of carriers allocated to the user terminal 110 can be fixed or can vary. If the set of carriers varies, the base station, for example 120a, can periodically send an update of the allocated set of carriers to the user terminal 110. Alternatively, the set of carriers assigned to a particular user terminal 110 may vary according to a predetermined frequency hopping algorithm. Thus, once the base station 120a assigns a set of carriers to a user terminal 110, the user terminal 110 can determine the next set of carriers based on a predetermined frequency hopping algorithm. The predetermined frequency hopping algorithm can be configured to ensure that the carrier set remains in the same reuse set that encompasses the previous carrier set.

The user terminal 110 can determine an estimate of the channel and interference based on the received pilot signal. Additionally, the user terminal 110 can determine an estimate of the signal quality of the received signal, such as by determining a received signal to noise ratio (SNR). The signal quality of the received signal can be quantified as a channel quality indicator (CQI) value, which can be determined, in part based on the estimated channel and interference. In a wireless communication system 100 implementing multiple reuse sets, the user terminal 110 advantageously determines a channel and interference estimate corresponding to the reuse set with which it is associated.

The user terminal 110 reports the CQI value back to the base station, for example 120a, and the base station 120a can compare the CQI value against one or more predetermined thresholds to determine a data format and rate that is likely supported by the channel. In a wireless communication system that implements a retransmission process, such as a Hybrid Automatic Repeat Request (HARQ) algorithm, the base station 120a can determine a data format and rate targeting an initial transmission or a subsequent retransmission.

In a wireless communication system 100 implementing HARQ, retransmissions may be transmitted at lower rates corresponding lower encoding rates. The HARQ implementation can be configured to provide a maximum number or retransmissions, and each of the retransmissions can occur at a lower rate. In other embodiments, the HARQ process can be configured to transmit some of the retransmissions at the same rate.

Figure 2:
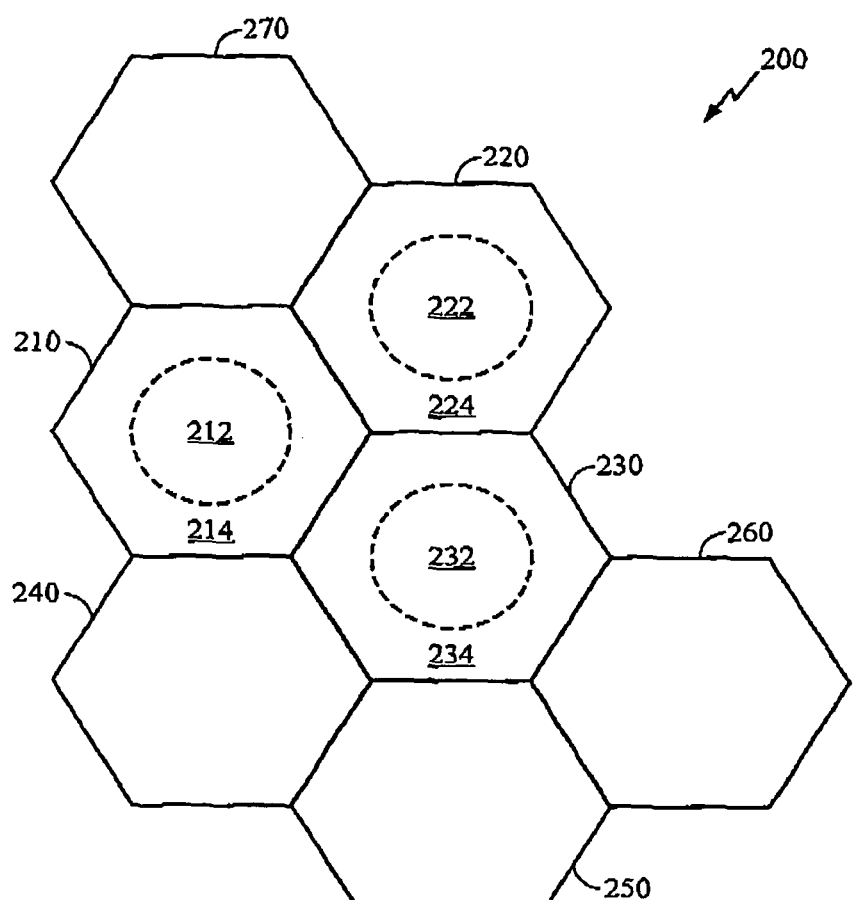
FIG. 2 is a coverage area diagram of an embodiment of a fractional reuse wireless communication system.

FIG. 2 is a coverage area diagram 200 of an embodiment of a cellular wireless communication system implementing fractional frequency reuse. The wireless communication system can be, for example, the wireless communication system 100 shown in FIG. 1.

The coverage area diagram 200 shows a number of coverage areas 210, 220, 230, 240, 250, 260, and 270 arranged to provide an overall coverage. Each of the coverage areas, for example 210, can have a base station positioned in the center. Of course, a wireless communication system is not limited to the number of coverage areas shown in FIG. 2, nor is the coverage area limited to the pattern shown in FIG. 2. The coverage areas, for example 210, can be configured to support OFDM communications using a predetermined number of carriers. One or more of the coverage areas, for example 210, can implement multiple reuse sets, and a plurality of the coverage areas, for example 210, 220, and 230, can implement partial frequency reuse.

A first coverage area 210 is shown as arranged as an outer hexagonal shape encompassing an inner circle. The first coverage area 210 can implement partial frequency reuse and multiple reuse sets. An inner coverage area 212 can implement a stable reuse set allocated to user terminals having a low probability of initiating a handoff. An outer coverage area 214, outside of the inner coverage area 212, can implement a handoff reuse set that can be allocated to user terminals that have a higher probability of initiating a handoff.

The stable reuse set can use a first set of carriers from the OFDM frequency set and the handoff reuse set can use a second distinct set of carriers from the OFDM frequency set. Additionally, the second set of carriers in the handoff reuse set can be shared with a reuse set of an adjacent coverage area, such as 220 or 230.

A user terminal in the first coverage area 210 can initially be allocated a set of carriers within the stable reuse set. The base station can, for example, communicate the assigned carriers in the stable reuse set to the user terminal. The user terminal can then determine subsequent carrier assignments within the stable reuse set based in part on a frequency hopping algorithm. During the time that the user terminal is allocated carriers from the stable reuse set, the user terminal determines channel and interference estimates, and determines a CQI value based on the stable reuse set.

As the user terminal ventures outside of the inner coverage area 212 to the outer coverage area 214, the base station may allocate a set of carriers from the handoff reuse set to the user terminal. Alternatively, the base station can transmit a control message to the user terminal to indicate that the user terminal should hop to the handoff reuse set. The user terminal can then determine subsequent carrier assignments within the handoff reuse set based in part on a frequency hopping algorithm, which can be the same or different from the frequency hopping algorithm used to determine carrier sets in the stable reuse set. The user terminal determines channel and interference estimates, and determines a CQI value based on the handoff reuse set. Such a reuse set configuration may be advantageous because fewer users can be assigned to the handoff reuse set, allowing the users in the handoff reuse set to see smaller interference levels.

Figure 3:
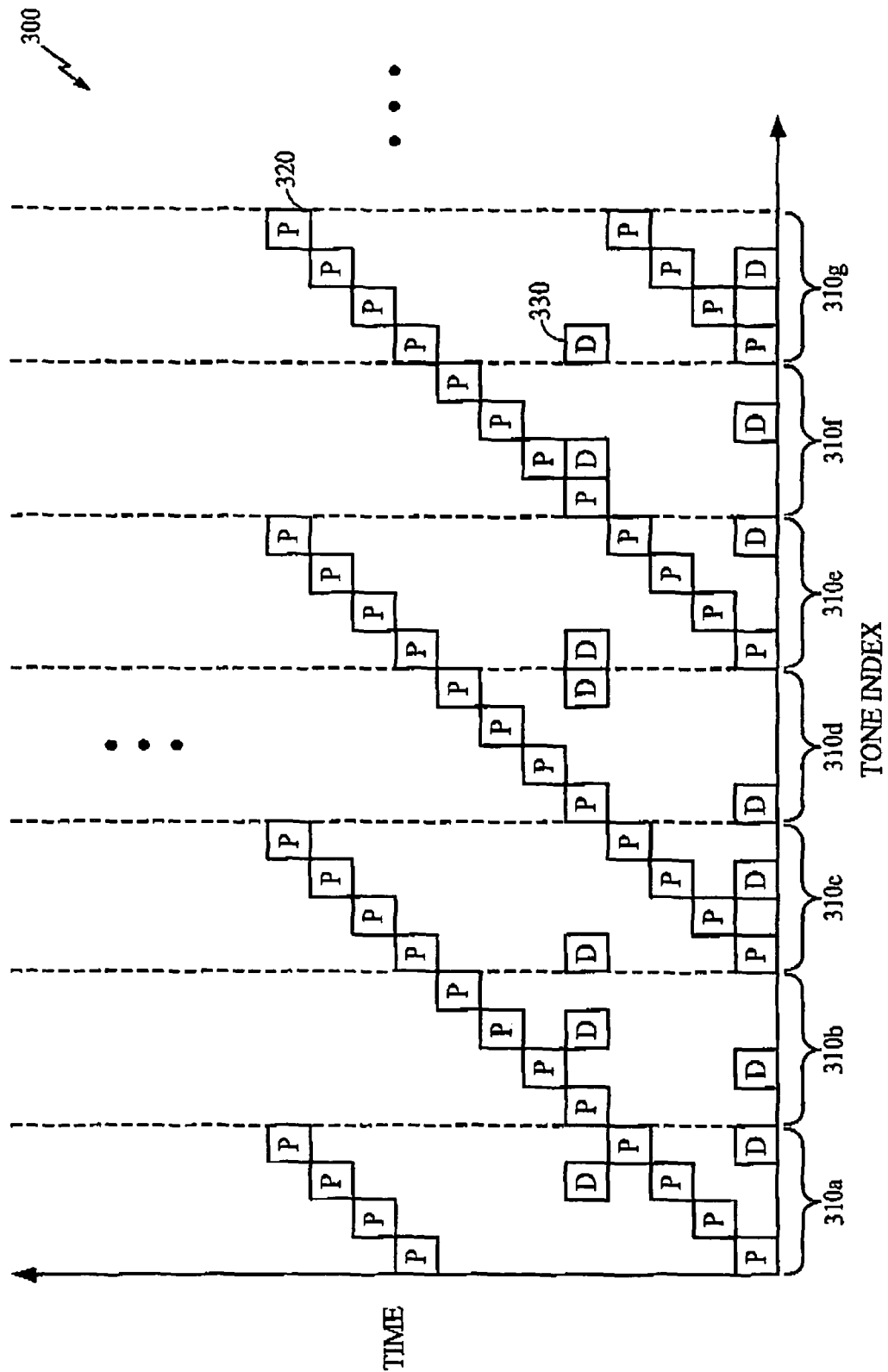
FIG. 3 is a time-frequency plot of an embodiment of a pilot channel carrier assignment.

FIG. 3 is a time-frequency diagram 300 of an example of a spectrum of an OFDMA communication system using a comb pilot signal with a dedicated pilot signal. The time-frequency diagram 300 illustrates an example of an OFDMA system in which carrier blocks 310a-310f are assigned to each user in the system. A number of common pilot signals, designated by 'P' e.g. 320, are present in each time epoch, but do not necessarily appear within each carrier block 310a-310f. Additionally, the common pilot signals, e.g. 320, are not assigned to the same carriers at each time epoch, but instead follow a predetermined algorithm. A number of dedicated pilot signals 330, designated by 'D' can be present within each carrier block 310a-310f but may not be present in each time epoch. Each receiver can determine channel and interference estimates based in part on all of the common 320 and dedicated 330 pilot signals.

A first set of carrier blocks, for example 310a-310d can be assigned to the stable reuse set and a second set of carrier blocks, for example 310e-310g, can be assigned to the handoff reuse set. The handoff reuse set can also be shared with a second base station. Because the different reuse sets have different interference levels, the user terminal can be configured to estimate the channel and interference and determine the CQI value based on the assigned reuse set. The user terminal can then report the CQI value back to the base station, for example, using a control channel or an overhead channel.

Figure 4:
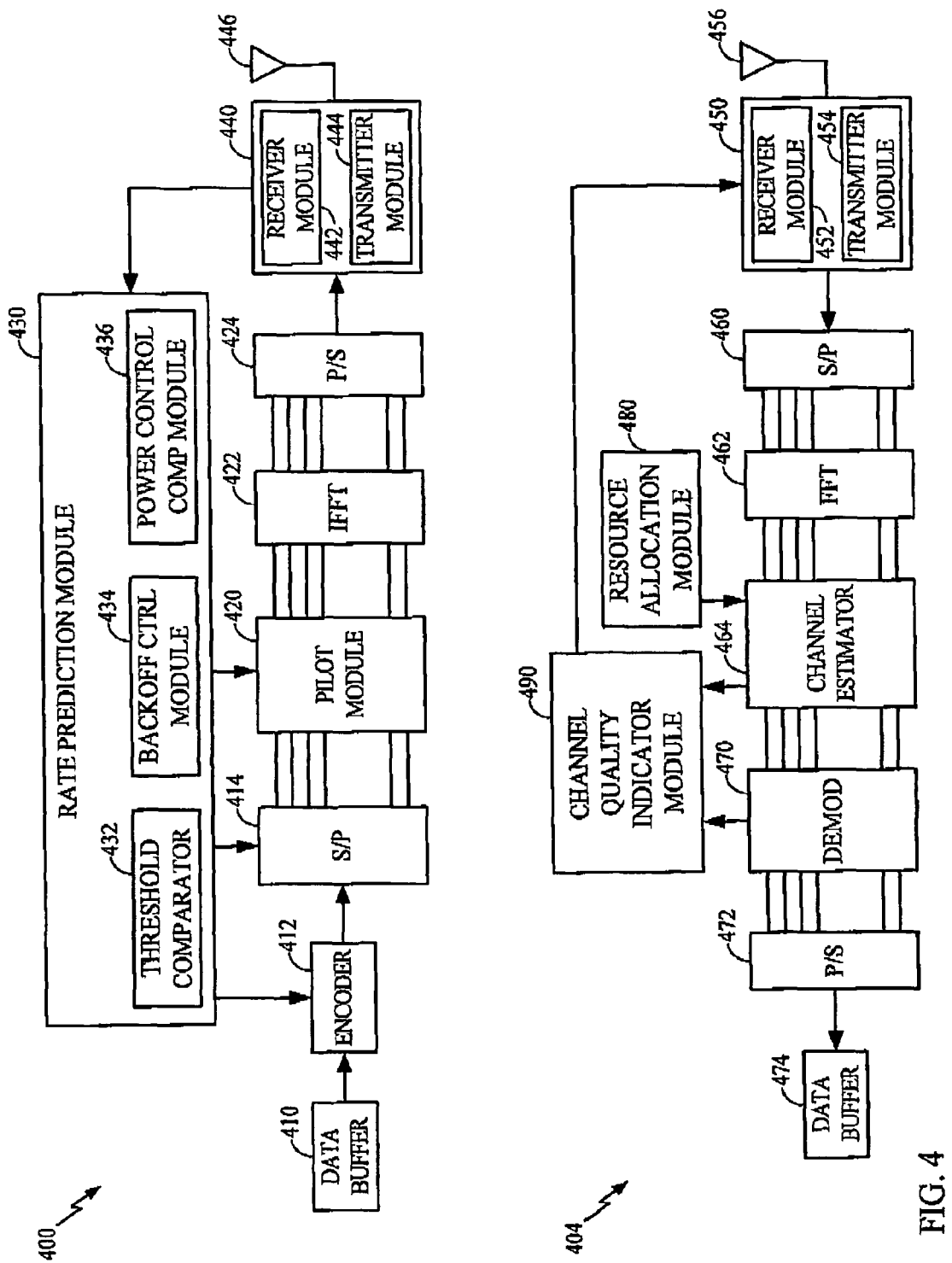
FIG. 4 is a functional block diagram of embodiments of a transmitter and receiver.

FIG. 4 is a functional block diagram of an embodiment of a data source 400 and receiver 404 that can be implemented with a wireless communication system such as the wireless communication system of FIG. 1. The data source 400 can be, for example, a transmitter portion within a base station or a transmitter portion within a user terminal. The embodiment of the receiver 404 similarly can be implemented, for example, in one or both of the base station and user terminal shown in the wireless communication system 100 of FIG. 1.

The following discussion describes an embodiment in which the data source 400 is implemented in a base station of a wireless communication system configured for OFDMA communications with fractional reuse and HARQ. The data source 400 is configured to transmit one or more OFDMA signals to one or more user terminals. The data source 400 includes a data buffer 410 configured to store data destined for one or more receivers. The data can be, for example, raw unencoded data or encoded data. Typically, the data stored in the data buffer 410 is unencoded, and is coupled to the encoder 412 where it is encoded according to the rate determined by the rate prediction module 430. The encoder 412 can include encoding for error detection and Forward Error Correction (FEC). The encoded data can be encoded according to one or more encoding algorithms. Each of the encoding algorithms and resultant coding rates can be associated with a particular data format of a multiple format HARQ system. The encoding can include, but is not limited to, convolutional coding, block coding, interleaving, direct sequence spreading, cyclic redundancy coding, and the like, or some other coding. The rate prediction module 430 performs selection of the data format and associated coding.

The encoded data to be transmitted is coupled to a serial to parallel converter 414 that is configured to convert a serial data stream from the encoder 412 to a plurality of data streams in parallel. The number of carriers allocated to any particular user terminal may be a subset of all available carriers. Therefore, the data destined for a particular user terminals is converted to those parallel data streams corresponding to the data carriers allocated to that user terminal.

The output of the serial to parallel converter 414 is coupled to a pilot module 420 that is configured to allocate the common pilot channels to the common pilot and to allocate the dedicated pilot signals. The pilot module 420 can be configured to modulate each of the carriers of the OFDMA system with a corresponding data or pilot signal.

The output of the pilot module 420 is coupled to an Inverse Fast Fourier Transform (IFFT) module 422. The IFFT module 422 is configured to transform the OFDMA carriers to corresponding time domain symbols. Of course, a Fast Fourier Transform (FFT) implementation is not a requirement, and a Discrete Fourier Transform (DFT) or some other type of transform can be used to generate the time domain symbols. The output of the IFFT module 422 is coupled to a parallel to serial converter 424 that is configured to convert the parallel time domain symbols to a serial stream.

The serial OFDMA symbol stream is coupled from the parallel to serial converter 424 to a transceiver 440. In this embodiment, the transceiver 440 is a base station transceiver configured to transmit the forward link signals and receive reverse link signals.

The transceiver 440 includes a transmitter module 444 that is configured to convert the serial symbol stream to an analog signal at an appropriate frequency for broadcast to user terminals via an antenna 446. The transceiver 440 can also include a receiver module 442 that is coupled to the antenna 446 and is configured to receive the signals transmitted by one or more remote user terminals.

A rate prediction module 430 is configured to determine the proper data format and corresponding encoding that can be supported over a communications channel linking the data source 400, such as a base station, to a receiver 404, such as a user terminal. The rate prediction module 430 receives one or more CQI values from the receiver 404, via a reverse link channel, and determines the data rate and associated encoding based on the CQI values.

The rate prediction module 430 can include a threshold comparator 432, backoff control module 434, and power control compensation module 436 that each process one or more of the received CQI values to assist in determining the appropriate rate.

The OFDMA wireless communication system typically uses power control on the forward link. The use of power control can complicate the rate-prediction determination because the user terminal typically reports a CQI value that is based on the pilot power or maybe the current data power. The CQI value determined by the user terminal in a future frame of transmission will be substantially different if the transmit power changes. Moreover, the user terminal may report an effective SNR which may be a non-linear function of the transmit power.

The base station can use the power control compensation module 436 to modify the CQI value to approximately account for transmit power variations. In one embodiment, the power control compensation module 436 performs a linear approximation relative to the power control value. If the transmit power changes up or down by a certain dB value, then the power control compensation module 436 modifies the reported CQI value by the same dB value.

The linear approximation implemented by the power control compensation module 436 is an approximation, and such, will likely result in a residual error which can be compensated. This error can be quite significant for certain operating conditions. Another thing to note is that this error can be one sided, i.e., it is positive when the transmit power increases and negative when the transmit power decreases.

The CQI value can be further biased, or compensated, to further reduce the mean error closer to zero. The backoff control module 434 can be configured to provide the additional compensation by subtracting a backoff value from the CQI value.

The backoff control module 434 can maintain a variable in dB, $\Delta$, referred to as backoff for every user terminal. Every time the user terminal reports a CQI value, the power control compensation module 436 adjusts the value to take transmit power variations into account. The backoff control module 434 then subtracts the value $\Delta$ from the modified CQI value. The value of $\Delta$ needs to be initialized to an appropriate value, and can also have defined minimum and maximum values. Apart from this, the backoff control module 434 can update the backoff value to satisfy the constraint that the packet error rate should be less than a predetermined threshold, such as 1%. To achieve this, the backoff control module 434 can increase the value of $\Delta$ by a predetermined increment, for example 0.25 dB, every time a packet is received in error. A packet error may refer to an unsuccessful last transmission in a HARQ system, not just an unsuccessful targeted transmission. The backoff control module 434 can be configured to reduce the backoff value by a predetermined amount, for example 0.25*0.01 dB, every time a packet is decoded correctly.

The backoff control module 434 may not have an upper bound on $\Delta$ since it is used to keep the packet error rate under 1%. However, the backoff control module 434 may implement a lower bound. A lower bound may be necessary because otherwise the rate prediction module 430 may drive to the last transmission of the highest feasible packet format, which might be a lower rate than the one that was targeted. As an initial value, the backoff control module 434 can implement a lower bound at 0 dB. The initial value is not very important except to avoid initial errors, and can be arbitrarily set to approximately 1.5 dB.

The threshold comparator 432 can be configured to compare the processed CQI value against a number of predetermined thresholds, with each threshold corresponding to a particular packet format and coding likely supported by the communication link. As noted before, in a HARQ system, the rate prediction module can target a rate that is subsequent to the first transmission.

As discussed above, the receiver 404 can be, for example, part of a user terminal 110 or base station 120a or 120b shown in FIG. 1. The following discussion describes a receiver 404 implemented within a user terminal.

The receiver 404 can include an antenna 456 coupled to a transceiver 450 configured to communicate over a wireless channel with the data source 400. The transceiver 450 can include a receiver module 452 configured to receive the wireless signals, via the antenna 456, and generate a serial baseband symbol stream.

The output of the receiver module 450 of the transceiver 450 is coupled to a serial to parallel converter 460 configured to convert the serial symbol stream to a plurality of parallel streams corresponding to the number of carriers in the OFDMA system.

The output of the serial to parallel converter 460 is coupled to a Fast Fourier Transform (FFT) module 462. The FFT module 462 is configured to transform the time domain symbols to the frequency domain counterpart.

The output of the FFT module 462 is coupled to a channel estimator 464 that is configure to determine a channel and interference estimate based in part on the common pilot signals and any dedicated pilot signals. A carrier allocation module 480 can determine the carriers assigned to the data, the carriers assigned to the common pilot signals, and the carriers, if any, assigned to the dedicated pilot signals. The carrier allocation module 480 can, for example, implement a frequency hopping algorithm to determine the current carrier assignment based on a past assignment. The carrier allocation module 480 can be configured to determine a carrier assignment for a particular reuse set. The carrier allocation module 480 is coupled to the channel estimator 464 and informs the channel estimator 464 of the carrier assignment.

The channel estimator 464 determines a channel and interference estimate based in part on the common pilot signals the dedicated pilot signals, if any. The channel estimator 464 can determine an estimate using a least squares method, a maximum likelihood estimate, a combination of least squares and maximum likelihood estimate, and the like, or some other process of channel and interference estimation.

The output of the channel estimator 464 including the frequency domain transform of the received symbols and the channel and interference estimate is coupled to a demodulator 470. The carrier allocation module 470 can also inform the demodulator 470 of the carrier frequencies allocated to data transmission. The demodulator 470 is configured to demodulate the received data carriers based in part on the channel and interference estimate. In some instances, the demodulator 470 may be unable to demodulate the received signals. As noted earlier, the demodulator 470 may be unsuccessful because the channel quality is inadequate and cannot support the transmitted rate of the data, or because degradation attributable to inadequate channel and interference estimation is sufficiently severe to result in decoding error.

If the demodulator 470 is unsuccessful, it can generate an indication of the inability to demodulate the received signals. The demodulator 470 can, for example, inform the carrier allocation module 480 such that the carrier allocation module 480 can expect a dedicated pilot signal in subsequent transmission. The demodulator 470 can also provide an unsuccessful demodulation indication to the transmitter module 454 in the transceiver 450 for transmission back to the data source 400.

If the demodulator 470 is unsuccessful, the received data is dropped, and there is no need to couple any data to memory. If the demodulator 470 is successful, the demodulator 470 can be configured to couple the demodulated data to a parallel to serial converter 472 that is configured to convert the parallel demodulated data to a serial data stream. The output of the parallel to serial converter 472 is coupled to a data buffer 474 for further processing.

A channel quality indicator (CQI) module 490 can also be coupled to the channel estimator 464 and demodulator 470 and can use the values of pilot power, channel estimate, and interference estimate to determine a value of the CQI. In one embodiment, the CQI value is based in part on the SNR. The CQI module 490 couples the CQI value to the transmitter module 454, which can be configured to transmit the value to the data source 400 using, for example, an overhead channel, control channel, or traffic channel.

The CQI module 490 can determine a CQI value for one or more reuse sets. For example, the CQI module 490 can determine a CQI value for the present reuse set based on the present subcarrier assignment and a predetermined frequency hopping algorithm. The CQI module 490 may also determine a CQI value for a reuse set distinct from the reuse set assigned to the receiver 404.

Figure 5:
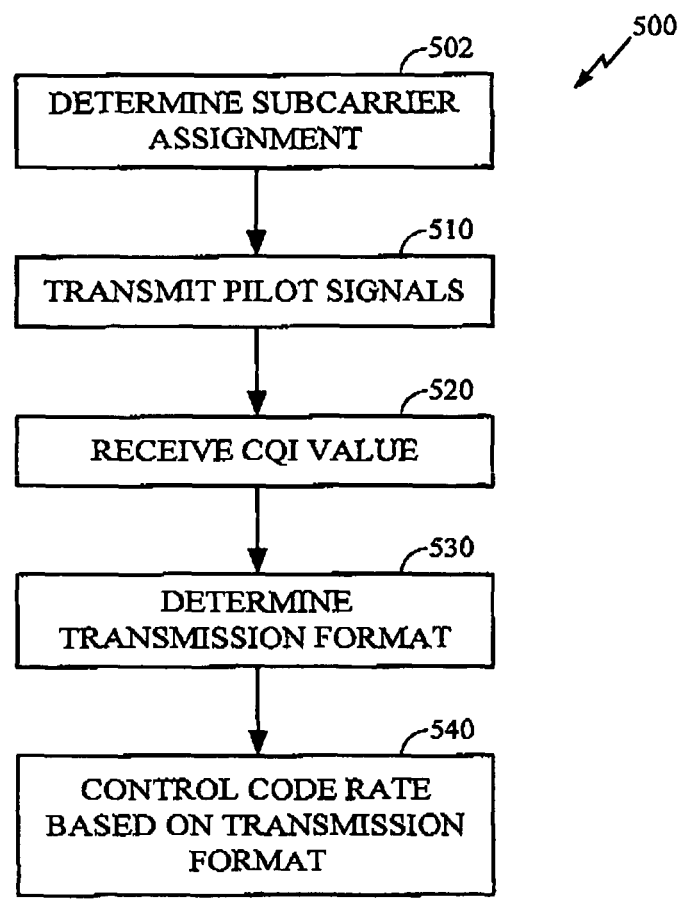
FIG. 5 is a flowchart of an embodiment of a method of rate prediction in a fractional reuse communication system.

FIG. 5 is a flowchart of an embodiment of a method 500 of rate prediction in a fractional reuse OFDMA system. The method 500 can be performed, for example, by the base station of the wireless communication system of FIG. 1 to configure the forward link transmissions. Alternatively, the method 500 can be performed by a user terminal of the wireless communication system of FIG. 1 to configure reverse link transmissions. The following description assumes a base station performs the method 500.

The method 500 begins at block 502 when the base station initially determines a subcarrier assignment within a reuse set of the fractional reuse communication system. The base station can, for example, determine a subcarrier assignment in a stable reuse set for a user terminal having a low probability of handoff, or within a predetermined radius of the base station. Alternatively, the base station may determine a subcarrier assignment in a handoff reuse set for a user terminal that has a high probability of handoff.

The base station can transmit the subcarrier assignment to the user terminal. The base station need not transmit the subcarrier assignment if the user terminal or mobile station can determine the subcarrier assignment based in part on a frequency hopping algorithm and a prior subcarrier assignment. The base station can transmit data to the user terminal on the assigned subcarriers.

The base station proceeds to block 510 and transmits a pilot signal. The pilot signal can include a common pilot signal and a dedicated pilot signal. The user terminal can receive the pilot signal and can determine, based on the subcarrier assignment and the pilot signals, a CQI value. The user terminal can transmit this CQI value to the base station.

The base station proceeds to block 520 and receives the CQI value based in part on the subcarrier assignment and the pilot signal. In an embodiment, the user terminal can determine and transmit a CQI value that is based on the current subcarrier assignment. In another embodiment, the user terminal can determine a CQI value based on a future subcarrier assignment that can be determined using the present subcarrier assignment and a frequency hopping algorithm.

The base station then proceeds to block 530 and determines a transmission format based in part on the channel quality indicator. As noted above, the base station can process the received CQI value using, for example, a power control compensation module, a backoff control module, and the like, or some other signal processing module. In some embodiments, the base station can average a predetermined number of CQI values.

The base station can determine the transmission format, for example, by comparing the CQI value against a number of predetermined thresholds. The base station then proceeds to block 540 and controls a code rate based in part on the transmission format.

The base station can, for example, control an encoder to encode data according to the code rate determined by the rate prediction module. The base station can then transmit the encoded data to the user terminal.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method, process, or algorithm described in connection with the embodiments disclosed herein may be embodied directly in hardware, in a software module executed by a processor, or in a combination of the two.

A software module may reside in RAM memory, flash memory, non-volatile memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. Further, the various methods may be performed in the order shown in the embodiments or may be performed using a modified order of steps. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method for rate control in a fractional reuse communication system, the method comprising:
    determining a subcarrier assignment within a reuse set, the subcarrier assignment including at least one subcarrier of a plurality of subcarriers encoding data in parallel for transmission;
    determining a transmission format based in part on a received channel quality indicator that is responsive to a pilot signal and the subcarrier assignment, the channel quality indicator being reported by a corresponding mobile station based on an identification of the reuse set as being associated with the subcarrier assignment; and
    controlling a code rate based in part on the transmission format.

2. The method of claim 1, wherein the pilot signal comprises a plurality of blank pilots.

3. The method of claim 1, wherein the pilot signal comprises at least one blank pilot within the reuse set.

4. The method of claim 1, wherein the channel quality indicator comprises a signal to noise ratio (SNR) based in part on an interference estimate determined using the subcarrier assignment.

5. The method of claim 1, wherein determining the transmission format comprises:
    comparing a value of the channel quality indicator against at least one predetermined threshold; and
    determining the transmission format based on results of the comparison.

6. The method of claim 1, wherein determining the transmission format comprises:
    generating a modified channel quality indicator value based on the channel quality indicator; and
    determining the transmission format based on the modified channel quality indicator value.

7. The method of claim 6, wherein generating the modified channel quality indicator value comprises summing a power control increment with the channel quality indicator value.

8. The method of claim 6, wherein generating the modified channel quality indicator value comprises summing a backoff value with the channel quality indicator value.

9. The method of claim 6, wherein generating the modified channel quality indicator value comprises determining an average channel quality indicator value based on the channel quality indicator value and at least one previously received channel quality indicator value.

10. The method of claim 1, wherein determining the transmission format comprises determining a packet format.

11. The method of claim 1, wherein determining the transmission format comprises determining the transmission format based in part on a retransmission process.

12. The method of claim 1, wherein determining the transmission format comprises:
    comparing the channel quality indicator value against a plurality of predetermined thresholds; and
    selecting a transmission format based in part on a threshold level from the plurality of predetermined thresholds.

13. The method of claim 1, further comprising selecting between a stable reuse set and a handoff reuse set for determining the subcarrier assignment based on a probability of a corresponding terminal initiating a handoff from a corresponding base station.

14. The method of claim 13, wherein the probability is based on a location of the terminal with respect to the base station, the stable reuse set being selected when the terminal is located within an inner coverage zone of the base station and the handoff reuse set being selected when the terminal is located within an outer coverage zone of the base station.

15. The method of claim 1, wherein the reuse set is selected from a group comprising a stable reuse set and a handoff reuse set.

16. A method for a mobile station of determining channel information in a fractional reuse communication system, the method comprising:

selecting, by the mobile station, a subcarrier of a plurality of subcarriers, the plurality of subcarriers encoding data in parallel for transmission;

identifying, by the mobile station, a fractional reuse set based on (i) the subcarrier and also based on (ii) a predetermined frequency hopping algorithm; and determining, by the mobile station, CQI based on the fractional reuse set.

17. The method of claim 16, wherein the subcarrier comprises a subcarrier from a prior subcarrier assignment.

18. The method of claim 16, wherein the subcarrier comprises a subcarrier distinct from a present subcarrier assignment.

19. The method of claim 16, wherein identifying the fractional reuse set comprises determining a set of subcarriers assigned during a predetermined time period.

20. The method of claim 16, wherein determining the CQI value comprises determining a Signal to Noise Ratio (SNR) over a predetermined time period.

21. The method of claim 16, further comprising:
selecting a second subcarrier that is not within the fractional reuse set; and
identifying a second fractional reuse set based at least in part on the second subcarrier.

22. The method of claim 16, further comprising:
receiving a first subcarrier assignment within the fractional reuse set, the first subcarrier assignment including the subcarrier of the plurality of subcarriers encoding data in parallel for transmission; and
determining a second subcarrier assignment within the fractional reuse set based at least in part on the subcarrier.

23. An apparatus for rate control in a fractional reuse communication system, the apparatus comprising:
a pilot module configured to generate a pilot signal;
a transmitter module configured to transmit the pilot signal;
a receiver configured to receive channel quality information based in part on the pilot signal and a subcarrier assignment in a fractional reuse set, the subcarrier assignment including at least one subcarrier of a plurality of subcarriers encoding data in parallel for transmission, and the channel quality information being reported by a corresponding mobile station based on an identification of the reuse set as being associated with the subcarrier assignment;
a rate prediction module configured to determine a coding rate based in part on the channel quality information; and
an encoder having an input coupled to the rate prediction module and an output coupled to the transmitter and configured to encode a data stream based on the coding rate.

24. The apparatus of claim 23, wherein the pilot signal comprises a dedicated pilot signal.

25. The apparatus of claim 24, wherein the dedicated pilot signal comprises at least one blank pilot in the subcarrier assignment.

26. The apparatus of claim 23, wherein the rate prediction module comprises a power control compensation module configured to sum a power control increment to a value of the channel quality information value, and wherein the rate prediction module determines the code rate based in part on the sum of the power control increment and the value of the channel quality information.

27. The apparatus of claim 23, wherein the rate prediction module comprises a backoff control module configured to sum a backoff value to a value of the channel quality information, and wherein the rate prediction module determines the code rate based in part on the sum of the backoff value and the value of the channel quality information.

28. The apparatus of claim 23, wherein the rate prediction module is configured to compare an indicator based at least in part on a value of the channel quality information to a plurality of predetermined thresholds and determines the code rate based in part on the comparison.

29. The apparatus of claim 23, wherein the rate prediction module is configured to determine the code rate corresponding to a retransmission rate in a Hybrid Automatic Repeat Request (HARQ) system.

30. The apparatus of claim 23, wherein the rate prediction module, encoder, and pilot module comprise a processor.

31. An apparatus for rate control in a fractional reuse communication system, the apparatus comprising:
means for determining a subcarrier assignment within a reuse set of the fractional reuse communication system, the subcarrier assignment including at least one subcarrier of a plurality of subcarriers encoding data in parallel for transmission;
means for transmitting a pilot signal;
means for receiving a channel quality indicator value based in part on the subcarrier assignment and the pilot signal, the channel quality indicator being reported by a corresponding mobile station based on an identification of the reuse set as being associated with the subcarrier assignment;
means for determining a transmission format based in part on the channel quality indicator; and
means for controlling a code rate based in part on the transmission format.

32. The apparatus of claim 31, further comprising means for transmitting the subcarrier assignment.

33. The apparatus of claim 31, wherein the means for determining the transmission format comprises:
means for comparing the channel quality indicator value against at least one predetermined threshold; and
means for determining the transmission format based on results of the comparison.

34. The apparatus of claim 31, wherein the means for determining the transmission format comprises:
means for generating a modified channel quality indicator value based on the channel quality indicator value; and
means for determining the transmission format based on the modified channel quality indicator value.

35. A mobile station apparatus for determining a Channel Quality Indicator (CQI) value in a fractional reuse communication system, the apparatus comprising:
means for selecting, by the mobile station, a subcarrier within the fractional reuse communication system, the subcarrier being one of a plurality of subcarriers encoding data in parallel for transmission;
means for identifying, by the mobile station, a fractional reuse set based on (i) the subcarrier and also based on (ii) a predetermined frequency hopping algorithm; and
means for determining, by the mobile station, the CQI value based on the fractional reuse set.

36. The apparatus of claim 35, wherein the means for identifying the fractional reuse set comprises means for determining a set of subcarriers assigned during a predetermined time period.

37. A non-transitory computer-readable storage medium comprising code, which, when executed by a machine, cause the machine to perform operations for rate control in a fractional reuse communication system, the non-transitory computer-readable storage medium comprising:

code for determining a subcarrier assignment within a reuse set of the fractional reuse communication system, the subcarrier assignment including at least one subcarrier of a plurality of subcarriers encoding data in parallel for transmission;

code for transmitting a pilot signal;

code for receiving a channel quality indicator value based in part on the subcarrier assignment and the pilot signal, the channel quality indicator being reported by a corresponding mobile station based on an identification of the reuse set as being associated with the subcarrier assignment;

code for determining a transmission format based in part on the channel quality indicator; and code for controlling a code rate based in part on the transmission format.

38. The non-transitory computer-readable storage medium of claim 37, further comprising code for transmitting the subcarrier assignment.

39. The non-transitory computer-readable storage medium of claim 37, wherein the code for determining the transmission format comprises:

code for comparing the channel quality indicator value against at least one predetermined threshold; and code for determining the transmission format based on results of the comparison.

40. The non-transitory computer-readable storage medium of claim 37, wherein the code for determining the transmission format comprises:

code for generating a modified channel quality indicator value based on the channel quality indicator value; and code for determining the transmission format based on the modified channel quality indicator value.

41. A non-transitory computer-readable storage medium comprising code, which, when executed by a machine, cause the machine to perform operations for a mobile station for determining a Channel Quality Indicator (CQI) value in a fractional reuse communication system, the non-transitory computer-readable storage medium comprising:

code for selecting, by the mobile station, a subcarrier within the fractional reuse communication system, the subcarrier being one of a plurality of subcarriers encoding data in parallel for transmission;

code for identifying, by the mobile station, a fractional reuse set based on (i) the subcarrier and also based on (ii) a predetermined frequency hopping algorithm; and code for determining, by the mobile station, the CQI value based on the fractional reuse set.

42. The non-transitory computer-readable storage medium of claim 41, wherein the code for identifying the fractional reuse set comprises code for determining a set of subcarriers assigned during a predetermined time period.

43. A mobile station apparatus for determining a Channel Quality Indicator (CQI) value in a fractional reuse communication system, the apparatus comprising:

a resource allocation module configured select, at the mobile station, a subcarrier within the fractional reuse communication system, the subcarrier being one of a plurality of subcarriers encoding data in parallel for transmission, and to identify, at the mobile station, a fractional reuse set based on (i) the subcarrier and also based on (ii) a predetermined frequency hopping algorithm; and a channel quality indicator module configured to determine, at the mobile station, the CQI value based on the fractional reuse set.

44. A method for a mobile station to report relevant channel information in a fractional reuse communication system, the method comprising:

receiving at least one assignment from a base station of a subcarrier among a plurality of subcarriers in the communication system, the plurality of subcarriers encoding data in parallel for transmission;

identifying a fractional reuse set associated with the mobile station based on the at least one assignment and a frequency hopping sequence associated with each assigned subcarrier; and reporting a Channel Quality Indicator (CQI) value to the base station for the identified fractional reuse set.

45. The method of claim 44, further comprising:

identifying a second fractional reuse set not associated with the mobile station based on the at least one assignment and the frequency hopping sequence associated with each assigned subcarrier; and reporting a CQI value to the base station for the second fractional reuse set.

46. The method of claim 15, wherein the subcarrier assignment comprises a subset of carriers from the handoff reuse set.

47. The method of claim 15, wherein the subcarrier assignment comprises a subset of carriers from the stable reuse set.

* * * * *